(12) United States Patent
Tovey et al.

(10) Patent No.: US 6,816,593 B1
(45) Date of Patent: Nov. 9, 2004

(54) METHOD AND APPARATUS FOR TRANSPOSING BITS

(75) Inventors: DeForest Tovey, Los Gatos, CA (US); Stephen C. Purcell, Mountain View, CA (US)

(73) Assignee: ATI International SRL, Christchruch (BB)

( * ) Notice: Subject to any disclaimer, the term of this patent is extended or adjusted under 35 U.S.C. 154(b) by 0 days.

(21) Appl. No.: 09/471,350

(22) Filed: Dec. 23, 1999

(51) Int. Cl.[7] .................................................. H04L 9/28
(52) U.S. Cl. ...................................... 380/28; 380/37
(58) Field of Search .................................... 380/28, 37

(56) References Cited

U.S. PATENT DOCUMENTS

| | | | | |
|---|---|---|---|---|
| 4,493,081 A | * | 1/1985 | Schmidt ..................... 714/754 |
| 4,992,933 A | * | 2/1991 | Taylor ......................... 712/22 |
| 5,063,526 A | * | 11/1991 | Kagawa et al. ............. 345/656 |
| 5,253,296 A | * | 10/1993 | Castleberry et al. .......... 380/36 |
| 5,477,543 A | * | 12/1995 | Purcell ........................ 370/537 |
| 5,544,091 A | * | 8/1996 | Watanabe ................... 708/400 |
| 5,600,843 A | * | 2/1997 | Kato et al. .................... 712/19 |
| 5,790,712 A | * | 8/1998 | Fandrianto et al. .......... 382/276 |
| 5,794,059 A | * | 8/1998 | Barker et al. ................. 712/10 |
| 6,094,715 A | * | 7/2000 | Wilkinson et al. ............ 712/20 |
| 6,441,842 B1 | * | 8/2002 | Fandrianto et al. ....... 348/14.13 |

\* cited by examiner

*Primary Examiner*—Gilberto Barrón
*Assistant Examiner*—Kambiz Zand
(74) *Attorney, Agent, or Firm*—Vedder, Price, Kaufman & Kammholz, P.C.

(57) ABSTRACT

A method and apparatus for transposing bits include processing that begins by receiving a multiple bit input. The multiple bit input may be received from memory for executing a read operation from a processing device or for a write operation to memory. The processing continues by determining whether a transposed bit function is enabled. When the transposed bit function is enabled, a set of tri-state transposed drivers are enabled to couple out bit lines to the multiple bit input in a transposed fashion. In addition, a set of tri-state non-transposed drivers are disabled such that they are not coupled to the output bit lines. When the transposed bit function is not enabled, the non-transposed drivers are enabled and the tri-state transposed drivers are disabled such that the multiple bit input, when coupled to the output bit lines, is not transposed.

14 Claims, 4 Drawing Sheets

| Bytes | non-transposed bits | transposed bits |
|---|---|---|
| B0 | b0 - b7 | b0, 8, 16, 24, 32, 40, 48, 56 |
| B1 | b8 - b15 | b1, 9, 17, 25, 33, 41, 49, 57 |
| B2 | b16 - b23 | b2, 10, 18, 26, 34, 42, 50, 58 |
| B3 | b24 - b31 | b3, 11, 19, 27, 35, 43, 51, 59 |
| B4 | b32 - b39 | b4, 12, 20, 28, 36, 44, 52, 60 |
| B5 | b40 - b47 | b5, 13, 21, 29, 37, 45, 53, 61 |
| B6 | b48 - b55 | b6, 14, 22, 30, 38, 46, 54, 62 |
| B7 | b56 - b63 | b7, 15, 23, 31, 39, 47, 55, 63 |

| bit 63 (b63) | b62 | b61 | b60 | b59 | b58 | b57 | bit 56 (b56) |
|---|---|---|---|---|---|---|---|
| bit 55 (b55) | b54 | b53 | b52 | b51 | b50 | b49 | bit 48 (b48) |
| bit 47 (b47) | b46 | b45 | b44 | b43 | b42 | b41 | bit 40 (b40) |
| bit 39 (b39) | b38 | b37 | b36 | b35 | b34 | b33 | bit 32 (b32) |
| bit 31 (b31) | b30 | b29 | b28 | b27 | b26 | b25 | bit 24 (b24) |
| bit 23 (b23) | b22 | b21 | b20 | b19 | b18 | b17 | bit 16 (b16) |
| bit 15 (b15) | 14 | b13 | b12 | b11 | b10 | b9 | bit 8 (b8) |
| bit 7 (b7) | b6 | b5 | b4 | b3 | b2 | b1 | bit 0 (b0) | memory block 10

FIG. 1

METHOD AND APPARATUS FOR TRANSPOSING BITS

TECHNICAL FIELD OF THE INVENTION

This invention relates generally to computer applications and more particularly to transposing bits for computer applications.

BACKGROUND OF THE INVENTION

Securing data that is stored in a computer's memory is known. Typically, the data is secured using a form of encryption. One such encryption technique is to transpose the bits of data as they are read into or written from memory. The transposing of bits changes the mapping of bit locations of memory to bit positions in data words. A data word includes at least one byte (i.e., eight bits) that has a particular bit pattern (e.g., b0, b1, b2, b3, b4, b5, b6, b7). When a plurality of data words are stored in a block of memory, the bit locations of memory may be mapped to different data words in accordance with the bit transposition scheme being used.

Currently, to achieve bit transposition in a computer, the computer's central processing unit executes a software bit transposition algorithm. While this technique enables a computer to implement bit transposition, it requires a fairly sophisticated algorithm, which, when executed, requires a noticeable amount of the central processing unit's processing resources.

Therefore, a need exists for a method and apparatus for transposing bits without the impact of software bit transposition algorithms.

BRIEF DESCRIPTION OF THE DRAWINGS

FIG. 1 illustrates a diagram of a memory block and corresponding table of transposed bits in accordance with the present invention;

DETAILED DESCRIPTION OF A PREFERRED EMBODIMENT

Figure 2:
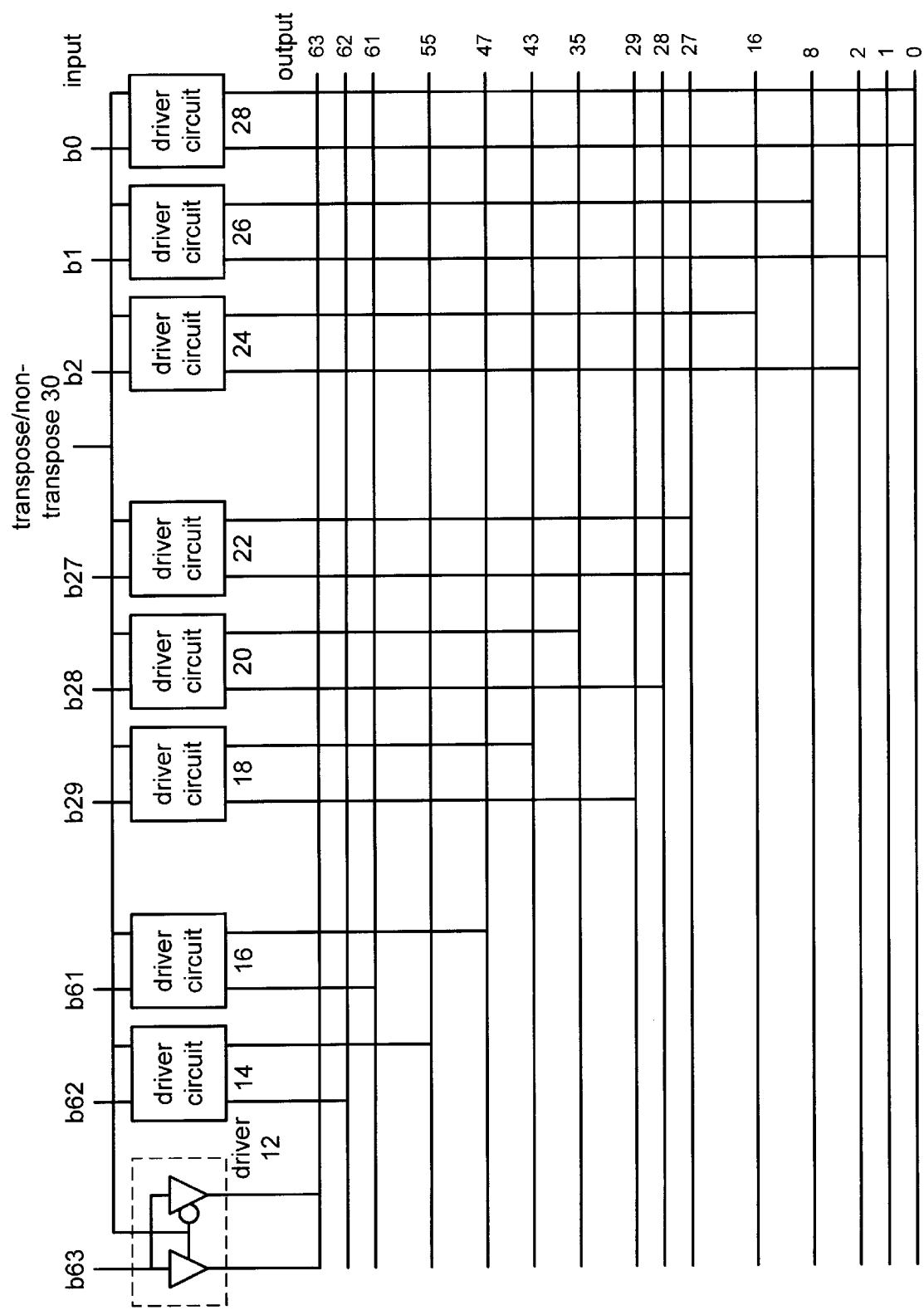
FIG. 2 illustrates a schematic block diagram of an apparatus for transposing bits in accordance with the present invention.

Generally, the present invention provides a method and apparatus for transposing bits. Such a method and apparatus includes processing that begins by receiving a multiple bit input. The multiple bit input may be received from memory for executing a read operation from a processing device, such as a central processing unit, or for a write operation to memory. The processing continues by determining whether a transposed bit function is enabled. When the transposed bit function is enabled, a set of tri-state transposed drivers are enabled to couple out bit lines to the multiple bit input in a transposed fashion (i.e., the output bits will be transposed in relation to the input bits). In addition, a set of tri-state non-transposed drivers are disabled such that they are not coupled to the output bit lines. When the transposed bit function is not enabled, the non-transposed drivers are enabled and the tri-state transposed drivers are disabled such that the multiple bit input, when coupled to the output bit lines, is not transposed. With such a method and apparatus, bits may be readily transposed by a computer without the negative CPU resource impact of software bit transposing algorithms.

The present invention can be more fully described with reference to FIGS. 1 through 5. FIG. 1 illustrates a diagram of a memory block 10 and a table illustrating the transposing of bits for a set of bytes, which may be implemented in conjunction with an arithmetic shifter as disclosed in U.S. Pat. No. 5,477,543. The memory block comprises an 8×8 bit matrix of memory locations. As shown, each memory location has a corresponding bit number. These bit numbers are fixed as the bit locations within the memory block in accordance with typical arrangements of memory blocks. As is generally known, a memory block is typically one or two bytes in width and multiple bytes in length. For example, a typical memory may be 16 bits, or two bytes, wide and 128 kilobytes in length.

The accompanying transposition bit table shows 8 bytes (B0 through B7), each including 8 bits in a transposed and non-transposed arrangement. For byte B0, the non-transposed bit pattern includes bits that are stored in bit locations b0 through b7. Note that for the purposes of this discussion, a bit will be designated with a lower case (b) and a byte will be designated with an upper case (B). The transposed bit pattern for B0 includes bits stored in bit locations b0, b8, b16, b24, b32, b40, b48 and b56. The transpose and non-transpose bit patterns for the other bytes (B1–B7) are also provided in the table. As can be seen in the table, the non-transposed bit pattern for a given byte corresponds to horizontal bit locations in the memory block 10 and the transposed bit pattern for a given byte corresponds to vertical bit locations in memory block 10.

The bit transposition of FIG. 1 is implemented using a general formula of $B_x[y]$ transposes to $B_y[x]$. For example, bit position 2 of byte 4 (i.e., $B_4[2]$) in the non-transposed bit patterns maps to bit position 4 of byte 2 (i.e., $B_2[4]$). Utilizing this transposition equation, the corresponding bit location maybe mapped to the appropriate byte. As one of average skill in the art will appreciate, other transposition relationships (i.e., non vertical to horizontal) may be used to map the non-transposed bit pattern to the transposed bit pattern. As one of average skill in the art will further appreciate, the memory block 10 may be larger or smaller than 64 bits.

FIG. 2 illustrates a schematic block diagram of an apparatus for transposing bits that includes a plurality of driver circuits 12 through 28. Each driver circuit includes a non-transposed tri-state driver and a transposed tri-state driver. The non-transposed tri-state driver is enabled when the transposed/non-transposed input 30 is in the non-transposed mode. When in non-transpose mode, the bit number of the input will correspond to the same bit number in the output. As shown, when the non-transposed input 30 is enabled, bit 63 of the input will be coupled to bit 63 of the output, bit 62 of the input will be coupled to bit 62 of the output, etc.

When the transposed/non-transposed input 30 is in the transposed mode, the transposed tri-state drivers will be active and the non-transposed tri-state drivers will be inactive. In this mode, the input bits will be coupled to the corresponding output as shown in the table of FIG. 1. For example, bit 62 of the input maps to bit 55 of the output, bit 61 of the input maps to bit 47 of the output, bit 29 of the input maps to bit 43 of the output, bit 28 of the input maps to bit 35 of the output, bit 2 of the input maps to bit 16 of the output, and bit 1 of the input maps to bit 8 of the output. Note that bit 63, bit 54, bit 45, bit 36, bit 27, bit 18, bit 9, and bit 0, of the input map to the same output bit whether in the transposed mode or non-transposed mode. For these particular bits in this implementation, the driver circuits may include a single driver that is not required to be tri-stated. As such, each of these driver circuits for the corresponding bit locations may include a buffer.

As one of average skill in the art would appreciate, with the circuit of FIG. 2, the input bits may map to any of the output bits. In general, an N position in the input may map to an N bit position in the output when in the non-transposed mode and the N bit position of the input may map to any M bit position in the output when in the transposed mode. As such, by generating a particular mapping of input/output, any bit transposing pattern may be achieved.

Figure 3:
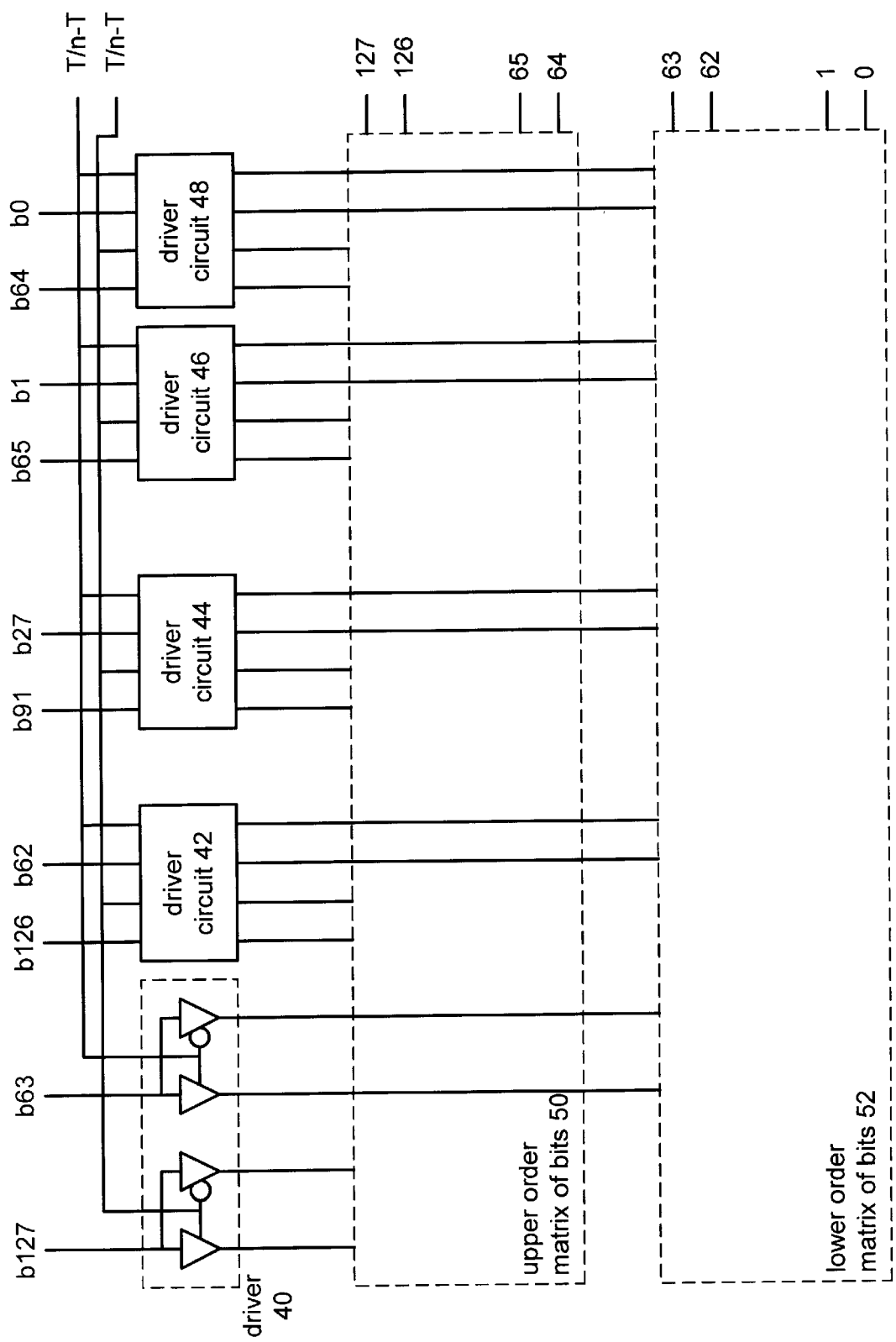
FIG. 3 illustrates a schematic block diagram of an alternate apparatus for transposing bits in accordance with the present invention.

FIG. 3 illustrates an alternate schematic block diagram of an apparatus for transposing bits. In this implementation, the memory apparatus includes an upper-order matrix of bits 50 and a lower order of matrix of bits 52. The lower order of bits 52 corresponds to the output bits shown in FIG. 2. The upper order matrix of bits 50 has a similar amount of bit lines as the lower order 52 but is numbered for output bit locations 64 through 127. The driver circuits 40 through 48 include two pairs of tri-state drivers. One of the drivers is a non-transposed tri-state driver while the other is a transposed tri-state driver. In this embodiment, the circuit functions in a similar manner as the circuit of FIG. 2 but on the upper and lower matrix of bits 50 and 52.

As shown, the upper order matrix of bits 50 and the lower order of matrix bits 52 may be independently transposed of one another. If one desires to transpose the upper and lower order matrix of bits 50 and 52 in the same manner, only a single input for transpose and non-transpose would be required. Note that the T/n-T corresponds to the transposed/non-transposed input for the plurality of drivers.

Figure 4:
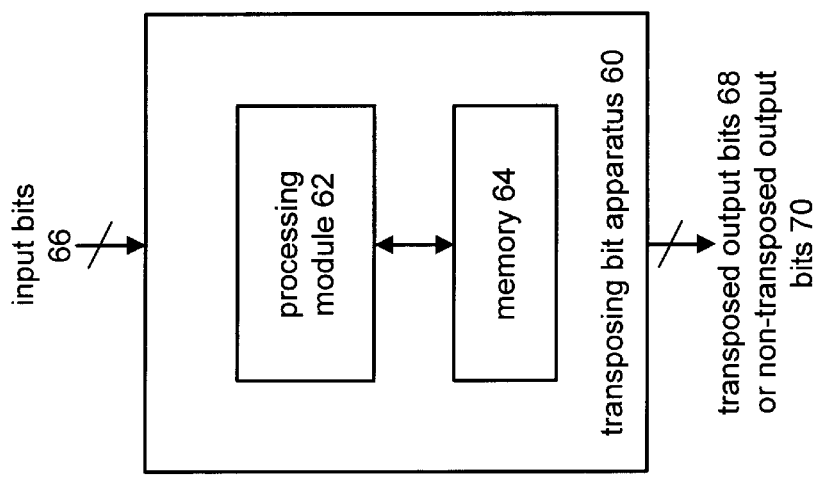
FIG. 4 illustrates a schematic block diagram of another alternate apparatus for transposing bits in accordance with the present invention.

FIG. 4 illustrates a schematic block diagram of a transposing bit apparatus 60 that includes a processing module 62 and memory 64. The processing module 62 may be implemented as a state machine and/or logic circuitry. Alternatively, the processing module may include a combination of a state machine, logic circuitry and a microprocessor, microcomputer, digital signal processor or central processing unit. The memory may be embedded within the processing module when the processing module is a state machine and/or logic circuit. If the processing module 62 implements one or more of its functions via a microprocessor, DSP, CPU, memory 64 will include system memory, hard disk memory, RAM, ROM, etc.

In operation, the transposing bit apparatus 60 receives a plurality of input bits 66. The transposing bit apparatus 60 produces transposed output bits 68 when the transposing is enabled and produces non-transposed output bits 70 when transposing is not enabled. To achieve the production of the transposed output bits 68 or the non-transposed output bit 70, the apparatus 60 performs the processing steps as shown in FIG. 5.

Figure 5:
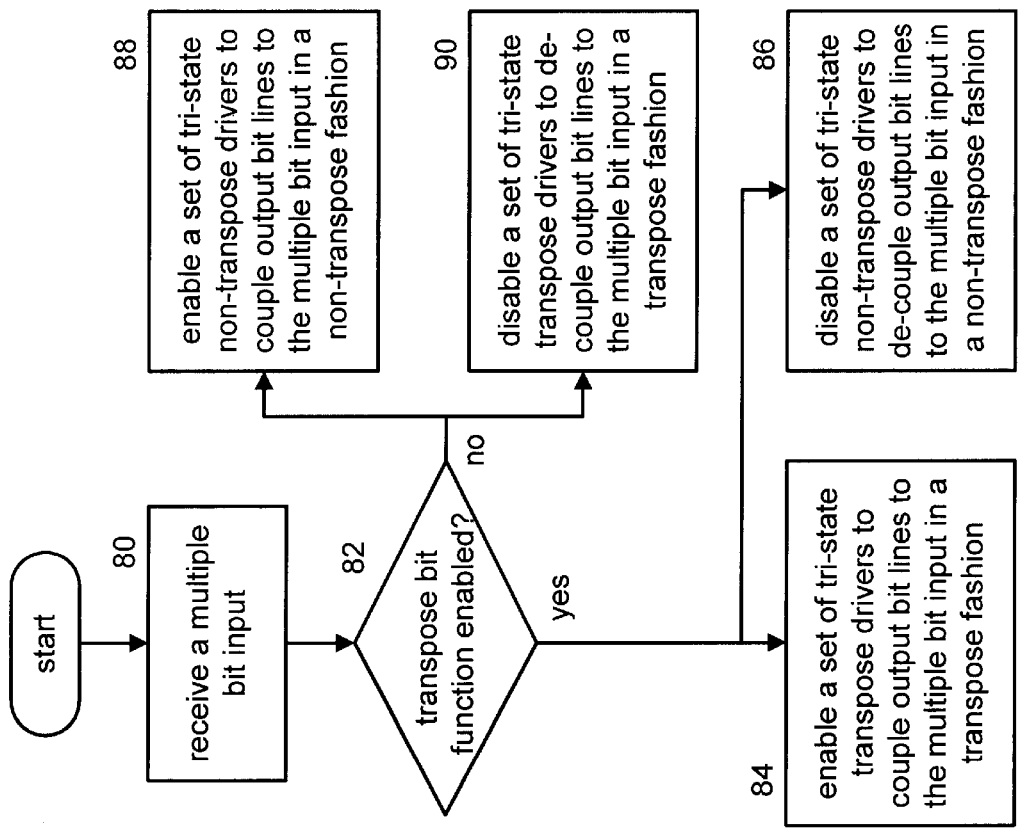
FIG. 5 illustrates a logic diagram of a method for transposing bits in accordance with the present invention.

FIG. 5 illustrates a logic diagram of a method for transposing bits. The process begins at step 80 where a multiple bit input is received. The multiple bit input may be received from memory to execute a read operation or from a processing device (e.g., a CPU) for a write to memory operation. The number of bits in the multiple bit input will depend on the particular configuration of memory. For example, the number of bits may be 16, 32, 64, 128, etc.

The process then proceeds to step 82 where a determination is made as to whether a transposed bit function is enabled. If not, the process proceeds to steps 88 and 90. At step 88, a set of tri-state non-transposed drivers are enabled to couple the output bit lines to the multiple bit input in a non-transposed fashion. At step 90, a set of tri-state transposed drivers are disabled decoupling the output bit lines from the multiple bit input.

If the transposed bit function is enabled, the process proceeds to step 84 and 86. At step 84, a set of tri-state transposed drivers are enabled to couple the output bit lines to the multiple bit input in a transposed fashion. At step 86, a set of tri-state non-transposed drivers are disabled decoupling the output line from the multiple bit line in a non-transposed fashion.

The processing of steps in FIG. 5 may be extended to a second multiple bit input for coupling to a second set of output bit lines. In essence, the processing steps of FIG. 5 may be used in either of circuits shown in FIG. 2–4.

The preceding discussion has presented a method and apparatus for transposing bits utilizing a hardware and/or firmware technique. By implementing the transposing of bits in this manner, the drawbacks of software, bit transposition algorithms are overcome. As one of average skill in the art would appreciate, other embodiments may be derived from the teachings of the present invention without deviating from the scope of the claims.

What is claimed is:

1. An apparatus for transposing bits comprising:
   a plurality of bit lines, wherein each of the plurality of bit lines corresponds to an output bit; and
   a plurality of driver circuits, wherein each of the plurality of driver circuits corresponds to a different input bit, wherein at least some of the plurality of driver circuits includes a transpose tri-state driver and a non-transpose tri-state driver, wherein an $N^{th}$ driver circuit of the plurality of driver circuits couples an $N^{th}$ input bit to one of the plurality of bit lines that corresponds to an $N^{th}$ output bit when the non-transpose tri-state driver is enabled, and wherein the $N^{th}$ driver circuit couples the $N^{th}$ input bit to one of the plurality of bit lines that corresponds to an $M^{th}$ output bit when the transpose tri-state driver is enabled.

2. The apparatus of claim 1 further comprises the output bits including a same number of bits as the input bits.

3. The apparatus of claim 1 further comprises a relationship between N and M that transposes byte and bit positions within a matrix of bits.

4. The apparatus of claim 1, wherein each of the plurality of driver circuits further comprises a second transpose tri-state driver and a second non-transpose tri-state driver, wherein the transpose tri-state driver and the non-transpose tri-state driver correspond to a lower order matrix of bits and the second transpose tri-state driver and the second non-transpose tri-state driver correspond to an upper order of matrix bits.

5. A method for transposing bits, the method comprises the steps of:
   a) receiving a multiple bit input;
   b) determining whether transpose bit function is enabled;
   c) when the transpose bit function is enabled, enabling a set of tri-state transpose drivers to couple output bit lines to the multiple bit input in a transposed fashion and disabling a set of tri-state non-transpose drivers to de-couple the output bit lines from the multiple bit input; and when the transpose bit function is not enabled, disabling the set of tri-state transpose drivers and enabling the set of tri-state non-transpose drivers to couple the output bit lines to the multiple bit input in a non-transposed fashion.

6. The method of claim 5, wherein the output bit lines comprise a same number of bit lines as the input bits such that the number of output bits equal the number of input bits.

7. The method of claim 5 further determining a relationship that transposes byte and bit positions of input bits to output bits within a matrix of bits.

8. The method of claim 5 further comprises:

receiving a second multiple bit input;

determining whether a second transpose bit function is enabled; and when the second transpose bit function is enabled, enabling a second set of tri-state transpose drivers to couple second output bit lines to the second multiple bit input in a transposed fashion and disabling a second set of tri-state non-transpose drivers to de-couple the second output bit lines from the second multiple bit input.

9. The method of claim 8 further comprises when the second transpose bit function is not enabled, disabling the second set of tri-state transpose drivers and enabling the second set of tri-state non-transpose drivers to couple the second output bit lines to the second multiple bit input in a non-transposed fashion.

10. An apparatus for transposing bits, the apparatus comprises: a processing module;

memory operably coupled to the processing module, wherein the memory includes operational instructions that cause the processing module to (a) receive a multiple bit input; (b) determine whether transpose bit function is enabled; and (c) when the transpose bit function is enabled, enable a set of tri-state transpose drivers to couple output bit lines to the multiple bit input in a transposed fashion and disable a set of tri-state non-transpose drivers to de-couple the output bit lines from the multiple bit input; and wherein the memory further comprises operational instructions that cause the processing module to, when the transpose bit function is not enabled, disable the set of tri-state transpose drivers and enable the set of tri-state non-transpose drivers to couple the output bit lines to the multiple bit input in a non-transposed fashion.

11. The apparatus of claim 10, wherein the output bit lines comprise a same number of bit lines as the input bits such that the number of output bits equal the number of input bits.

12. The apparatus of claim 10, wherein the memory further comprises operational instructions that cause the processing module to determine a relationship that transposes byte and bit positions of input bits to output bits within a matrix of bits.

13. The apparatus of claim 10, wherein the memory further comprises operational instructions that cause the processing module to:

receive a second multiple bit input;

determine whether a second transpose bit function is enabled; and when the second transpose bit function is enabled, enable a second set of tri-state transpose drivers to couple second output bit lines to the second multiple bit input in a transposed fashion and disable a second set of tri-state non-transpose drivers to de-couple the second output bit lines from the second multiple bit input.

14. The apparatus of claim 13, wherein the memory further comprises operational instructions that cause the processing module to, when the second transpose bit function is not enabled, disable the second set of tri-state transpose drivers and enable the second set of tri-state non-transpose drivers to couple the second output bit lines to the second multiple bit input in a non-transposed fashion.

* * * * *